June 5, 1956 B. C. COLE ET AL 2,749,191
LOWER LINE COUPLING FOR FIBER ATTENUATING APPARATUS
Filed June 21, 1954 2 Sheets-Sheet 1
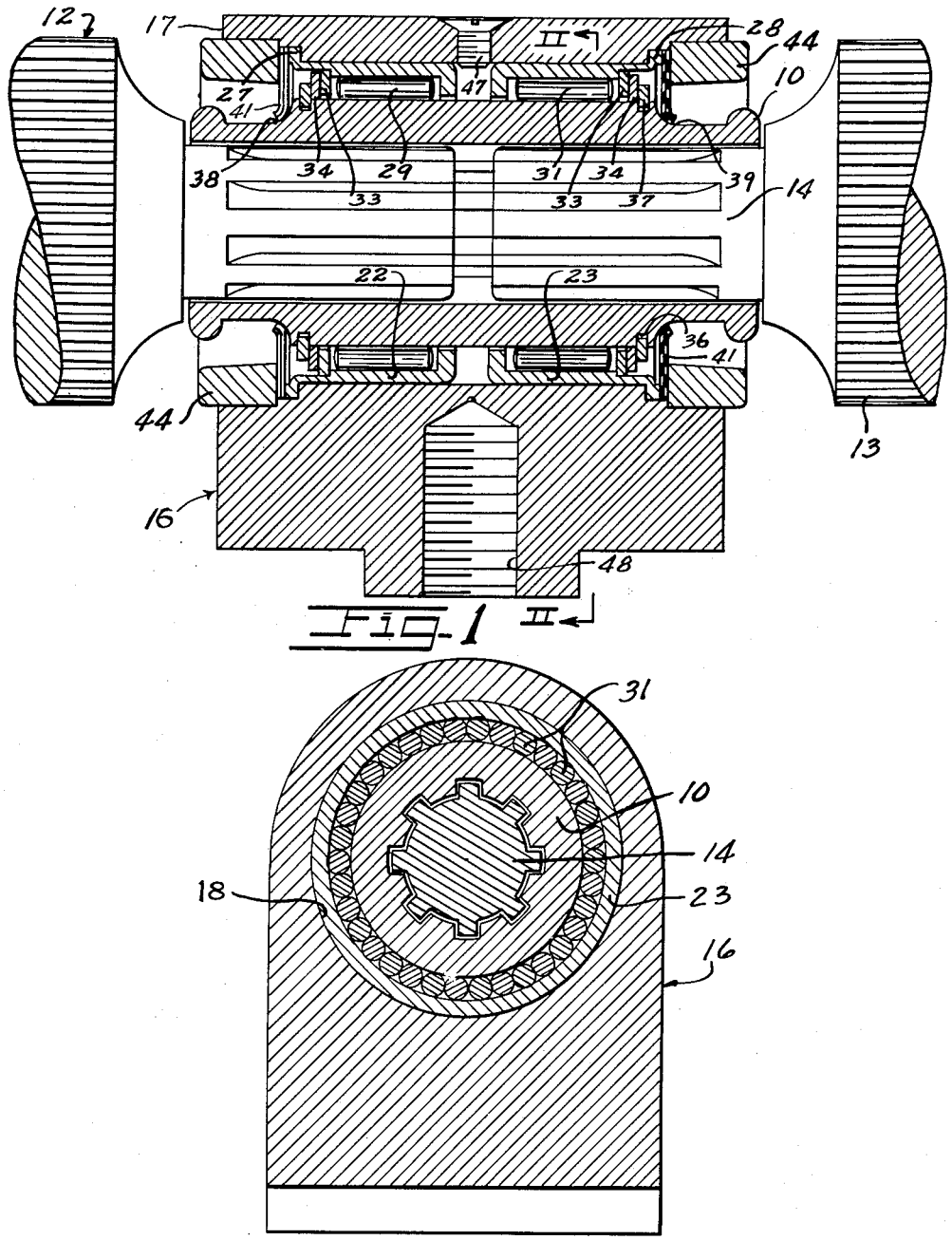
INVENTORS
BURREL C. COLE
EDWIN P. WAITE
BY *Jennings & Carter*
ATTORNEYS

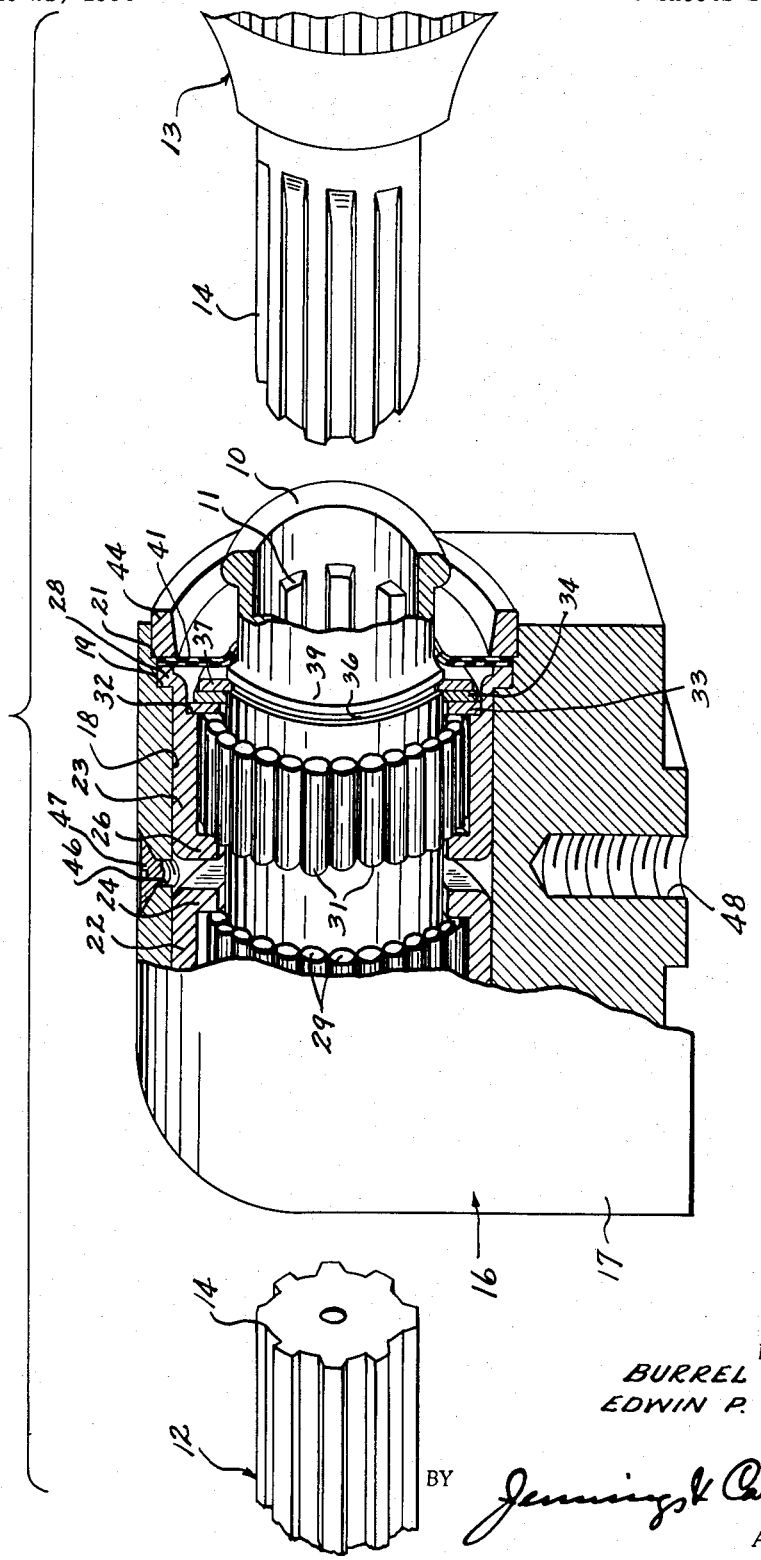

United States Patent Office 2,749,191
Patented June 5, 1956

2,749,191

LOWER LINE COUPLING FOR FIBER ATTENUATING APPARATUS

Burrel C. Cole and Edwin P. Waite, Columbus, Ga., assignors to Cole Engineering Corporation, a corporation of Georgia Application June 21, 1954, Serial No. 437,965

1 Claim. (Cl. 308—178)

This invention relates to a lower line coupling for fiber attenuating apparatus, such as spinning frames, roving frames, drawing frames and the like, and has for an object the provision of improved means for joining the roll sections of the lower line whereby each section aligns itself and maintains its own concentricity independent of other roll sections in the line.

Another object of our invention is to provide a lower line coupling for fiber attenuating apparatus which shall embody a bearing assembly with a built in thrust control that limits the thrust to each individual section, whereby the individual sections of the line may be assembled or disassembled on the frame.

A further object of our invention is to provide a lower line coupling of the character designated which, together with its supporting bearings, shall be self contained and embody seals which hold the lubricant within the bearing areas and at the same time hold lint and other foreign matter out of the bearings and lubricant therefor, thereby maintaining the yarn and frames in a clean condition and permitting the apparatus to operate for long periods of time without roll cleaning or relubrication.

As is well known in the art to which our invention relates, lower lines of rolls have been made up in sections approximately 2 feet in length and joined together by various means, such as rigid square neck or screw neck connections, to form in effect a continuous rigid shaft sometimes reaching 50 feet in length. Because of the limited diameters of the rolls, it has also been the practice to support the line in bearings which are remote from the joints. With such supporting means, the rolls must be assembled before installing the sections in the frame and the bearings require constant lubrication. Since the mill floors are not always level, it is difficult to align the supporting bearings for the lines of rolls. Accordingly, when the sections are rotated any misalignment of the bearings will cause the radial load imposed on the roll sections to vary thereby placing undue strains upon both the joints and the bearings, requiring extra power and shortening the life of the roll sections and the coupling. It has also been proposed to employ a single ball bearing which surrounds the abutting ends of the roll sections. Difficulties with this means of supporting the roll sections have been met due to the fact that where the abutting ends of the roll sections are slightly misaligned relative to each other there results a wobble or beating action between the abutting ends of the roll sections and the single bearing surrounding the same.

To overcome the above and other difficulties, we provide a tubular sleeve connection for the roll sections. The sleeve is supported by anti-friction bearings adjacent each end thereof and axial movement of the bearings relative to the sleeve is controlled by a built in thrust element. Internal splines are provided in the sleeve for receiving external splines provided on the ends of the roll sections. This construction permits both the sleeves and the rolls to be machined from true centers, thereby insuring concentricity and providing a multiple splined joint that has the torsional strength of a series of keys and keyways. The outer surface of the sleeve adjacent the ends is tapered outwardly and slidably engaging the outwardly tapered portion of the sleeve at each end is a flexible sealing member which is secured adjacent its outer perimeter to a stationary part of the bearing support.

A lower line coupling embodying features of our invention is illustrated in the accompanying drawings forming a part of this application, in which:

Fig. 1 is a longitudinal sectional view of the coupling, the roll section being shown in elevation;

Fig. 2 is a sectional view taken along the line II—II of Fig. 1; and,

Fig. 3 is a perspective view partly broken away and in section showing the roll sections removed from the sleeve.

Referring now to the drawings for a better understanding of our invention we show a cylindrical sleeve 10 having a plurality of axially extending splines 11 along the inner surface thereof. Fitting in each end of the sleeve 10 are the ends of roll sections 12 and 13 having axially extending external splines 14 thereon. A multiple spline fitting is thus provided between the sleeve and the roll sections having the torsional strength of a series of keys and keyways. There is a small clearance between the external spline 14 on the roll sections and the internal splines 11 whereby the ends of the roll sections may be pressed into the sleeve by hand to permit a slight universal action and to provide for self-alignment of the roll sections relative to the sleeve.

The cylindrical sleeve 10 is supported by a bearing assembly 16 comprising an outer housing 17 having a cylindrical bore 18 therethrough. The bore 18 is provided with enlarged diameter portions adjacent each end of the housing 17 to provide radially extending annular shoulders 19 and 21. Pressed into opposite ends of the bore 18 are annular bearing races 22 and 23 having inturned annular flanges 24 and 26, respectively, at the inner ends thereof. The outer ends of the annular bearing races 22 and 23 are provided with outturned annular flanges 27 and 28 which engage the shoulders 19 thereby limiting inward movement of the races. As shown in Figs. 1 and 3 the inturned flanges 24 and 26 at the inner ends of the bearing races are spaced from each other to provide a space for receiving lubricant therebetween. Also, the inturned flanges 24 and 26 are spaced from the sleeve member 10 to provide a passageway for feeding lubricant therebetween. Positioned between the cylindrical sleeve 10 and the bearing races 22 and 23 are sets of free rollers 29 and 31, respectively. With the rollers loaded into the bearing unit as shown in the drawings, inward movement thereof is limited by the inturned flanges 24 and 26.

The internal diameter of the bearing races 22 and 23 is enlarged adjacent the outer ends thereof to provide radially extending annular shoulders 32. Pressed into the outer ends of the bearing races 22 and 23 and contacting the shoulders 32 are annular retaining washers 33. The shoulders 32 are positioned so as to permit the proper end clearance for the rollers 29 and 31 between the inturned flanges 24 and 26 and the retaining washers 33.

To provide for controlled axial movement of the bearing assembly and housing relative to the sleeve 10, annular thrust washers 34 are installed on the sleeve member in position to bear against the outer surface of the retaining washers 33. Annular radially extending grooves 36 are provided in the exterior surface of the sleeve member 10 outwardly of and adjacent the thrust washers 34 for receiving lock rings 37 which partially surround the sleeve and bear against the thrust washers 34.

The sleeve member 10 is provided with outwardly tapered portions 38 and 39 adjacent the outer ends thereof and outwardly of the grooves 36. To seal in the lubricant and to prevent the entrance of foreign materials into the bearing areas, annular flexible seal members 41 are provided. Preferably, the flexible seals 41 are formed of a woven material coated on each side with synthetic rubber or the like. The outer perimeters of the seals 41 bear against the bearing races 22 and 23 while the inner surfaces thereof slidably engage the outwardly tapered portions 38 and 39 of the sleeve member. The outer perimeters of the seal members 41 are locked in position by annular members 44 which are pressed into the ends of the bore 18 and bear against both the flexible seals 41 and the shoulders 21. The shoulders 21 are so positioned that the annular members 44 slightly compress the perimeters of the seal members against the outer ends of the bearing races. The annular members 44 also protect the sealing members 41 against lap-ups or wrapping of fibers around the shaft and also convey loose fibers away from the sealing members. The inner diameters of the annular sealing members 41 rests with light tension and a running fit against the outwardly tapered portions 38 and 39 on the sleeve member.

To provide a method of re-lubrication of the bearing assembly after long periods of operation, we provide a threaded opening 46 for receiving a threaded plug 47. Also, an internally threaded opening 48 is provided in the bottom of the housing 17 whereby the assembled unit may be rigidly attached to the roll stands of the fiber attenuating machine by any suitable means, such as a lock washer and cap screw.

From the foregoing it will be seen that we have devised an improved lower line coupling for fiber attenuating apparatus. By providing a sleeve which is connected to the ends of the roll sections by a multiple spline connection whereby the individual sections may align themselves relative to the sleeve member together with free rollers at each end of the sleeve for supporting the same, a limited misalignment of the supporting bearing is permitted with a minimum of strain on both the joints and the bearings. Also, our construction permits both the sleeve and the rolls to be machined from true centers thereby insuring concentricity and providing a splined joint which has the torsional strength of a series of keys and keyways. Furthermore, by providing a flexible sealing member at each end of the sleeve member which is secured at its outer perimeter to a stationary part of the bearing assembly and with the inner surface thereof slidably engaging an outwardly tapered surface on the sleeve the lubricant is held within the unit and at the same time lint and other foreign materials are held out of the bearing areas.

While we have shown our invention in but one form, it will be obvious to those skilled in the art that it is not so limited but is susceptible of various changes and modifications without departing from the spirit thereof, and we desire therefore, that only such limitations shall be placed thereupon as are specifically set forth in the appended claim.

What we claim is:

In a coupling for sections of a driven line of rolls for fiber attenuating apparatus, a housing having a cylindrical bore therethrough, a sleeve in said bore, bearing races pressed into opposite ends of said bore and surrounding said sleeve, inturned annular flanges at the inner ends of said races, outturned annular flanges at the outer ends of said races engaging said housing whereby inward movement of said races is limited, free rollers between said bearing races and said sleeve, annular retaining washers surrounding said sleeve and pressed into the bearing races outwardly of said rollers, shoulders on the inner surface of said bearing races limiting inward movement of said retaining washers, and means bearing against the outer surface of the retaining washers limiting outward movement thereof.

References Cited in the file of this patent

UNITED STATES PATENTS 2,151,834     Bugatti _____ Mar. 28, 1939